(12) United States Patent
Winters et al.

(10) Patent No.: US 10,589,464 B2
(45) Date of Patent: Mar. 17, 2020

(54) SPREADER ROLLER FOR ADDITIVE MANUFACTURING

(71) Applicant: HEWLETT-PACKARD DEVELOPMENT COMPANY, L.P., Houston, TX (US)

(72) Inventors: William Winters, Portland, OR (US); Wesley R. Schalk, Camas, WA (US); Matthew A. Shepherd, Vancouver, WA (US); Matt G. Driggers, Vancouver, WA (US); Justin M. Roman, Portland, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/073,209

(22) PCT Filed: Mar. 17, 2016

(86) PCT No.: PCT/US2016/022960
§ 371 (c)(1),
(2) Date: Jul. 26, 2018

(87) PCT Pub. No.: WO2017/160299
PCT Pub. Date: Sep. 21, 2017

(65) Prior Publication Data
US 2019/0030804 A1    Jan. 31, 2019

(51) Int. Cl.
*B29C 64/218* (2017.01)
*B33Y 30/00* (2015.01)
*B33Y 50/02* (2015.01)
*B33Y 40/00* (2020.01)
(Continued)

(52) U.S. Cl.
CPC .......... *B29C 64/218* (2017.08); *B29C 64/165* (2017.08); *B29C 64/364* (2017.08);
(Continued)

(58) Field of Classification Search
None
See application file for complete search history.

(56) References Cited

U.S. PATENT DOCUMENTS 3,961,741 A * 6/1976 Klein ................. B21C 37/0803
228/144
5,784,957 A    6/1998 Rau et al.
(Continued)

FOREIGN PATENT DOCUMENTS

| EP | 1674243 | 6/2006 |
|---|---|---|
| WO | WO-2015056230 | 4/2015 |
| WO | WO-2015170330 | 11/2015 |

OTHER PUBLICATIONS

International Search Report and Written Opinion for International Publication No. PCT/US2016/022960 dated Dec. 16, 2016, 11 pages.

*Primary Examiner* — Mary Lynn F Theisen
(74) *Attorney, Agent, or Firm* — HP Inc. Patent Department

(57) ABSTRACT

In one example, a temperature control system for a spreader roller in an additive manufacturing machine includes: a first duct to carry air to an air passage through the roller; a second duct to carry air away from the air passage through the roller; a fan to move air through the ducts; a temperature sensor to sense a temperature of the roller; and a controller to control a flow of air through the ducts based on a temperature sensed by the sensor.

17 Claims, 9 Drawing Sheets

(51) Int. Cl.
*B29C 64/364* (2017.01)
*B29C 64/393* (2017.01)
*B29C 64/165* (2017.01)
*B33Y 10/00* (2015.01)

(52) U.S. Cl.
CPC ............ *B29C 64/393* (2017.08); *B33Y 30/00* (2014.12); *B33Y 40/00* (2014.12); *B33Y 50/02* (2014.12); *B33Y 10/00* (2014.12)

(56) References Cited

U.S. PATENT DOCUMENTS

| | | | |
|---|---|---|---|
| 6,182,743 B1* | 2/2001 | Bennett | F28F 1/40 |
| | | | 165/133 |
| 7,073,442 B2 | 7/2006 | Fedor et al. | |
| 7,261,541 B2 | 8/2007 | Fong | |
| 7,942,987 B2 | 5/2011 | Crump et al. | |
| 8,718,522 B2 | 5/2014 | Chillscyzn et al. | |
| 8,879,957 B2 | 11/2014 | Hanson et al. | |
| 2004/0003738 A1* | 1/2004 | Imiolek | B22F 3/1055 |
| | | | 101/480 |
| 2005/0016722 A1 | 1/2005 | Sanders | |
| 2005/0104241 A1 | 5/2005 | Kritchman et al. | |
| 2009/0206522 A1 | 8/2009 | Hein et al. | |
| 2014/0265045 A1* | 9/2014 | Cullen | B29C 64/205 |
| | | | 264/497 |
| 2015/0165681 A1 | 6/2015 | Fish et al. | |
| 2015/0266237 A1 | 9/2015 | Comb et al. | |
| 2015/0367415 A1* | 12/2015 | Buller | B23K 26/346 |
| | | | 419/53 |
| 2016/0243619 A1* | 8/2016 | Gothait | C09D 11/30 |
| 2016/0368054 A1* | 12/2016 | Ng | B22F 3/1055 |

\* cited by examiner

SPREADER ROLLER FOR ADDITIVE MANUFACTURING

BACKGROUND

Additive manufacturing machines produce 3D (three-dimensional) objects by building up layers of material. Some additive manufacturing machines are commonly referred to as "3D printers." 3D printers and other additive manufacturing machines make it possible to convert a CAD (computer aided design) model or other digital representation of an object into the physical object. Digital data is processed into slices each defining that part of a layer or layers of build material to be formed into the object.

DRAWINGS

The same part numbers designate the same or similar parts throughout the figures. The figures are not necessarily to scale.

DESCRIPTION

In some additive manufacturing processes, the object slices are formed in a build material spread in layers over the work area. For example, heat may be used to fuse together the particles in layers of a powdered build material to form a solid object. Powdered build material is spread over the work area to form each layer at the desired thickness. Heat to fuse build material in each layer may be generated, for example, by applying a liquid fusing agent to the powder in the pattern of a single slice of the object and then exposing the patterned area to a light or other energy source. The fusing agent absorbs energy to help sinter, melt or otherwise fuse the powdered build material. Manufacturing proceeds layer by layer and slice by slice until the object is complete.

In some additive manufacturing machines, a roller is used to spread build material in layers over the work area. It may be desirable in some implementations to control the temperature of the spreader roller, for example by cooling the roller to inhibit the adverse effects of overheating. Accordingly, a new temperature control system has been developed for a spreader roller in an additive manufacturing machine. In one example, the temperature control system includes a fan and ducting to circulate air through the inside of the roller, and a controller to control the flow of air through the ducts based on the temperature of the roller. The controller may be programmed to regulate the speed of the fan, for example, to adjust the air flow to maintain the desired temperature profile for the roller. In one example in which a rotating roller is used to spread build material, the roller assembly includes bearings to allow the roller to rotate relative to the air ducts. Thus, a process to spread build material over a work area in an additive manufacturing machine may include circulating air through a rotating roller and, while circulating air through the rotating roller, spreading powdered build material over the work area with the rotating roller.

These and other examples described below and shown in the figures illustrate but do not limit the scope of the patent, which is defined in the Claims following this Description.

As used in this document: "and/or" means at least one of the connected things; a "bearing" means any part on which another part turns or slides; a "uniform temperature" means ±20° C. between a measured temperature and a target temperature at any location on the roller; and "work area" means any suitable structural area to support or contain build material for fusing, including underlying layers of build material and in-process slice and other object structures.

Figure 1:
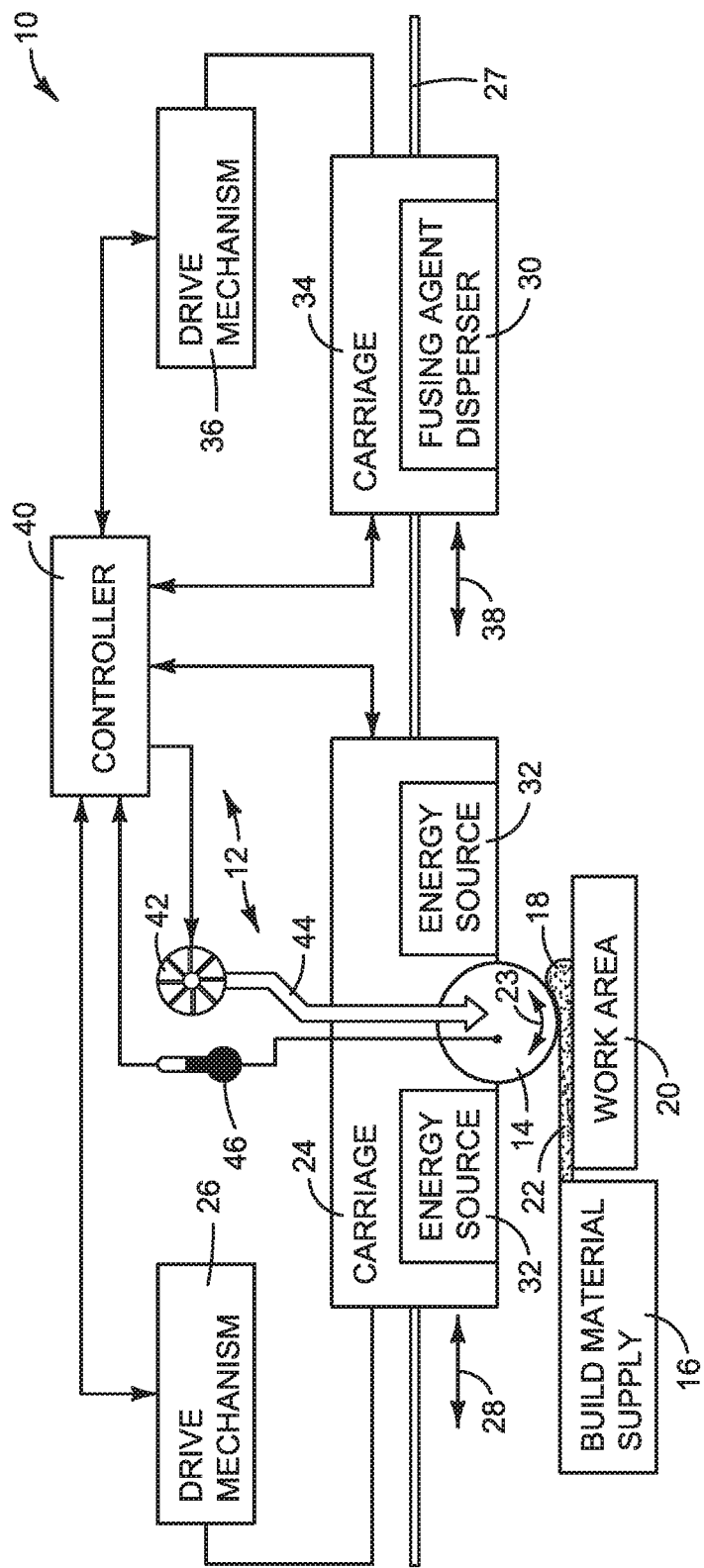
FIG. 1 is a block diagram illustrating an additive manufacturing machine implementing one example of a temperature control system for a build material spreader roller.
Figure 2:
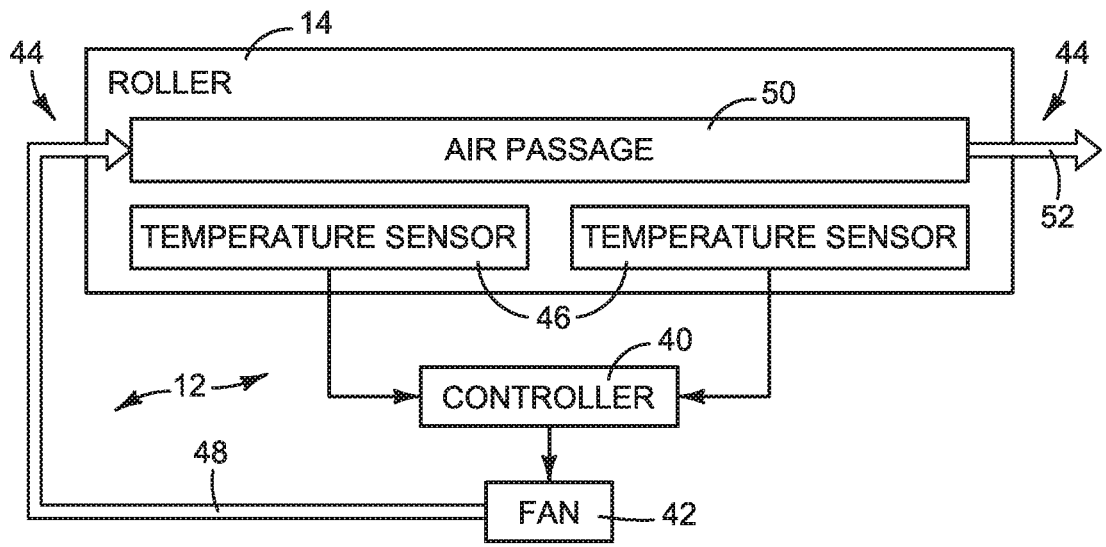
FIG. 2 is a block diagram illustrating one example of a spreader roller temperature control system in more detail.

FIG. 1 is a block diagram illustrating an additive manufacturing machine 10 implementing one example of a temperature control system 12 for a spreader roller 14. FIG. 2 is a block diagram illustrating a temperature control system 12 in more detail. Machine 10 in FIG. 1 is just one example for implementing a spreader roller temperature control system 12. A temperature control system 12 may be implemented in other types or configurations of additive manufacturing machines.

Referring to FIG. 1, machine 10 includes a supply 16 of a powdered or other spreadable build material 18 and a roller 14 to spread build material 18 over a work area 20, for example in a layer 22. Spreader roller 14 may rotate freely as it is moved over work area 20, freewheeling clockwise or counter-clockwise depending on the direction of travel, or roller 14 may be driven rotationally in either direction (co-rotated or counter-rotated), as indicated by rotation arrow 23. Work area 20 in the figures represents any suitable structure to support or contain build material for fusing, including underlying layers of build material and in-process slice and other object structures. For a first layer 22 of build material 18, for example, work area 20 may be formed by the surface of a platform that moves up and down to adjust the thickness of each layer. For succeeding layers 22 of build material 18, for example, work area 20 may be formed by the underlying layer (or layers) of build material, which may include fused and unfused build material.

Build material supply 16 may be implemented, for example, as a hopper or other dispenser that presents build material 18 to spreader roller 14 for layering on to work area 20. Roller 14 is mounted to a movable carriage 24 that carries roller 14 back and forth over work area 20 at the urging of a translating drive mechanism 26, for example along a rail 27, as indicated by translation arrows 28. Additive manufacturing machine 10 also includes a fusing agent dispenser 30 and a source 32 of light or other fusing energy. In this example, fusing agent dispenser 30 is mounted to a movable carriage 34 and energy source 32 is implemented as multiple energy sources 32 mounted to roller carriage 24. Dispenser carriage 34 carries fusing agent dispenser 30 back and forth over work area 20 at the urging of a translating drive mechanism 36, for example along rail 27, as indicated by translation arrows 38.

Continuing to refer to FIG. 1, additive manufacturing machine 10 includes a controller 40 with the processing resources, memory and instructions, and the electronic circuitry and components needed to control the operative elements of machine 10. Controller 40 processes the control data and other instructions to manufacture a 3D object. In one example operation, build material 18 is dispensed from supply 16 and spread with roller 14 as carriage 24 moves over work area 20. A fusing agent is selectively applied to layered build material in a pattern corresponding to an object slice, as fusing agent dispenser 30 on carriage 34 is moved over work area 20. One or multiple energy sources 32 are energized to expose the patterned area to light or other electromagnetic radiation to fuse build material where fusing agent has been applied, as carriage 24 carrying energy sources 32 is moved over work area 20. The fusing agent absorbs energy to help sinter, melt or otherwise fuse the patterned build material. Manufacturing proceeds layer by layer and slice by slice until the object is complete.

Referring now also to FIG. 2, temperature control system 12 for spreader roller 14 includes a fan 42 and ducting 44 to circulate a cooling gas through the inside of roller 14. While it is expected that fan 42 usually will be located remote from roller carriage 24, it may be desirable in some implementations to locate fan 42 on roller carriage 24. Any suitable gas may be used with system 12 to cool roller 14 including, for example, ambient air, chilled air and inert gases. It is expected that ambient air will provide adequate cooling in many additive manufacturing applications and, thus, will often be desirable to help minimize the cost and complexity of a temperature control system 12. Reference is made to air as the cooling gas in the remainder of this Description although, as noted above, other gases may be used.

System 12 also includes a temperature sensor 46 to sense the temperature of roller 14. Controller 40 is operatively connected to sensor 46 and fan 42 and/or ducting 44 to control the flow of air through ducting 44 based on the temperature of roller 14. For example, controller 40 may be programmed to regulate the speed of fan 42 and/or the flow capacity of ducting 44 to adjust the air flow to maintain the desired temperature for roller 14. In the example shown in FIG. 2, ducting 44 includes a supply duct 48 to carry air to a passage 50 through roller 14 and an exhaust duct 52 to carry air away from passage 50. Multiple temperature sensors 46 shown in FIG. 2 may be desirable in some implementations, for example to more accurately determine a temperature profile along the length of roller 14.

In some additive manufacturing applications, a polyamide powder is used for build material 18. In such applications, patterned build material may reach 185° C. or more during fusing. Heat from fusing raises the temperature of roller 14 as successive layers of build material are spread over the work area. If the temperature of roller 14 is too high, powder may stick to the roller. If the temperature of roller 14 is too low, the roller may cool the powder during spreading, and thus interfere with proper fusing. While the target temperature for a spreader roller 14 will vary based on the type of build material and other characteristics of the manufacturing process, it is expected that a variation of ±20° C. from the target temperature along the length the spreader roller will be acceptable in many additive manufacturing processes using a polyamide build material. Thus, in one example for a PA12 powdered build material 18 in which the target temperature for roller 14 is 100° C., controller 40 may be programmed to regulate the speed of fan 42 to adjust the air flow through ducting 44 to maintain the temperature of roller 14 in the range of 80° C. to 120° C. measured at any location along the roller. In another example, for a PA11 powdered build material 18 in which the target temperature for roller 14 is 115° C., controller 40 may be programmed to regulate the speed of fan 42 to adjust the air flow through ducting 44 to maintain the temperature of roller 14 in the range of 95° C. to 135° C. measured at any location along the roller.

While only one spreader roller 14 is shown in FIG. 1, an additive manufacturing machine 10 could include multiple spreader rollers 14 that operate together or separately, and that utilize the same or different temperature control systems 12.

Figure 3:
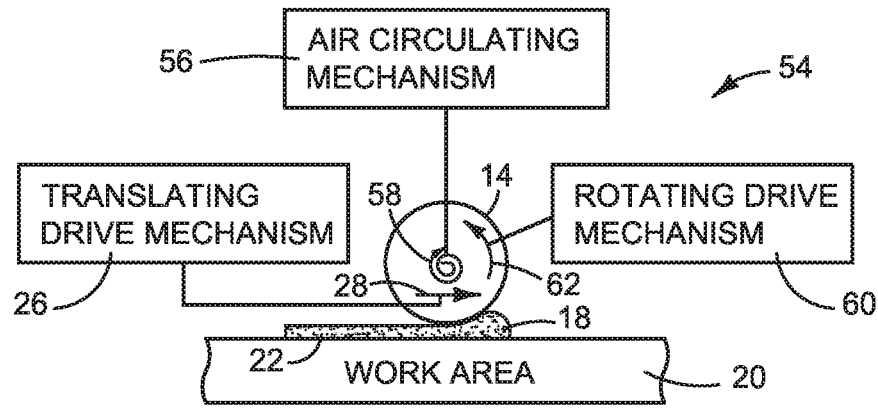
FIG. 3 is a block diagram illustrating one example of a build material spreader system that includes a mechanism to circulate air or another cooling gas through a counter-rotating spreader roller.

A counter-rotating roller is sometimes used in additive manufacturing to help effectively spread a powdered build material over the work area. The spreader roller is driven in the direction opposite the direction the roller would rotate if it were simply rolled across the powder. FIG. 3 is a block diagram illustrating one example of a spreader system 54 that includes a mechanism 56 to circulate air or another cooling gas through a counter-rotating spreader roller 14. The flow of gas through roller 14 is indicated by a spiral arrow 58. Spreader system 54 in FIG. 3 also includes a translating drive mechanism 26 to move roller 14 linearly over work area 20, as indicated by translation arrow 28, and a rotating drive mechanism 60 to rotate roller 14 as it is moved over the work area, as indicated by rotation arrow 62. As described in detail below with reference to FIGS. 5-10, a bearing between roller 14 and ducts 48, 52 allows cooling air to flow through roller 14 even as roller 14 is rotated during a spreading operation.

Figure 4:
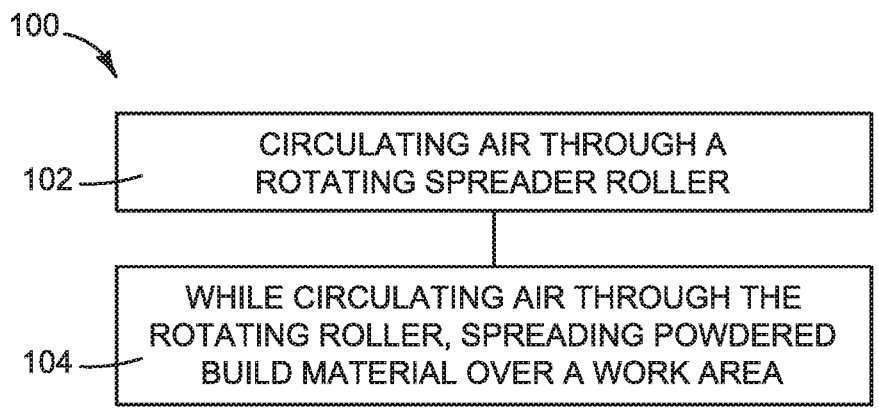
FIG. 4 is a flow diagram illustrating one example of a process to spread powdered build material over a work area in an additive manufacturing machine, such as might be implemented with the system shown in FIG. 3.
Figure 5:
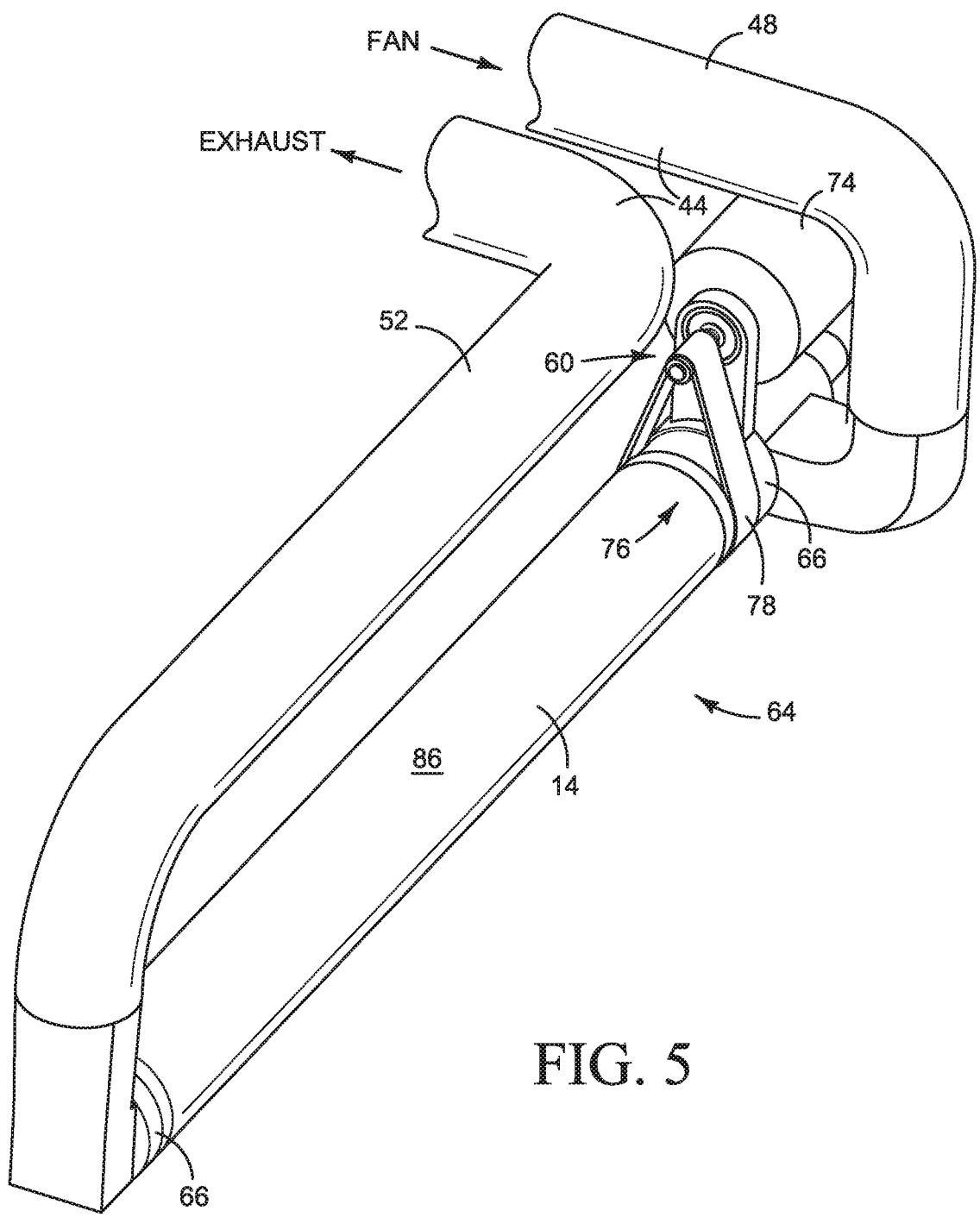
FIGS. 5-10 are perspectives illustrating one example of a rotating spreader roller and ducting to circulate a cooling gas through the roller.
Figure 6:
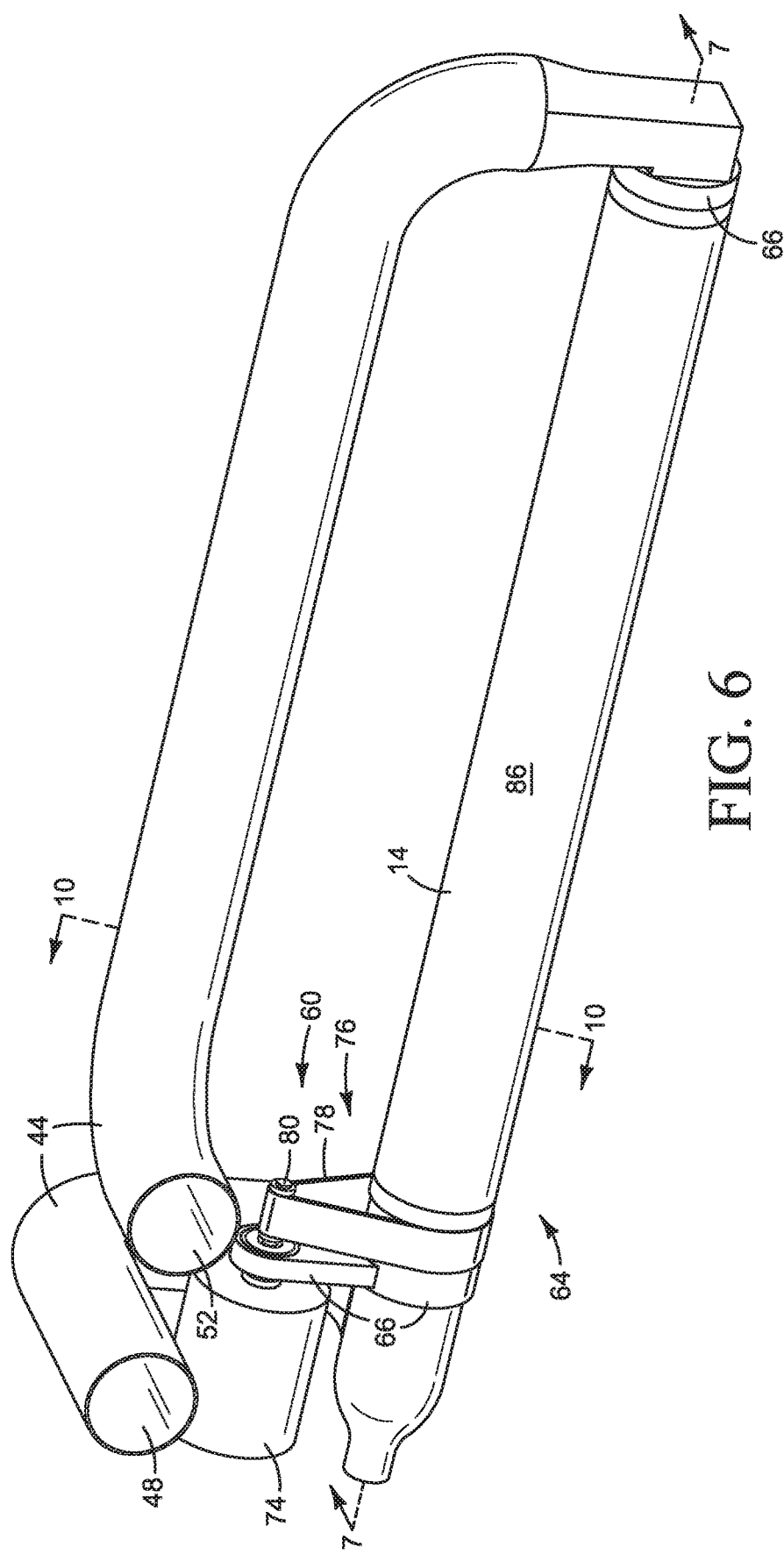

FIG. 4 is a flow diagram illustrating one example of a process 100 to spread powdered build material over a work area in an additive manufacturing machine, such as might be implemented with a system 54 shown in FIG. 3. Referring to FIG. 4, process 100 includes circulating air through a rotating roller (block 102) and, while circulating air through the rotating roller, spreading powdered build material over the work area with the rotating roller (block 104).

Figure 7:
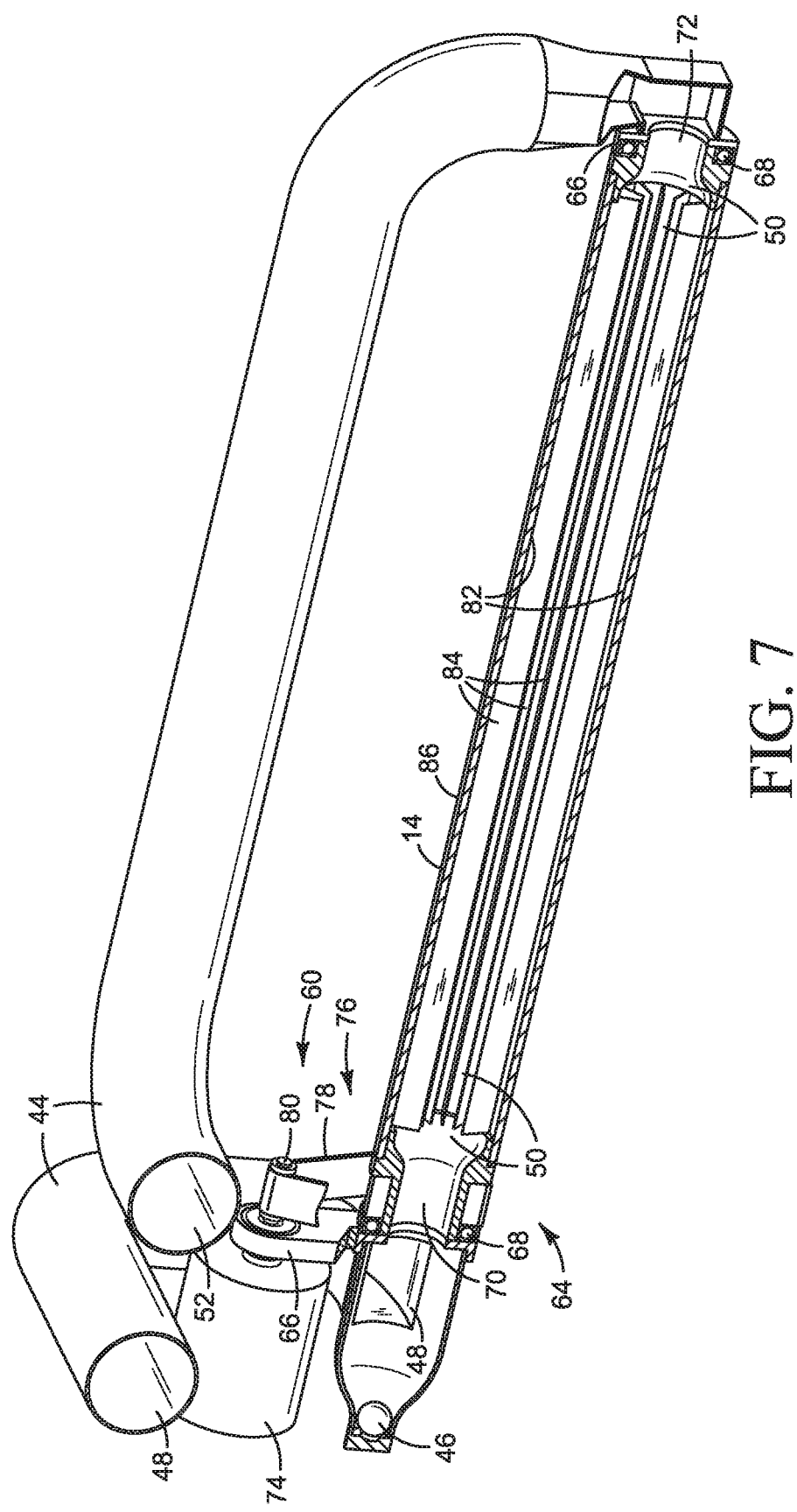
Figure 8:
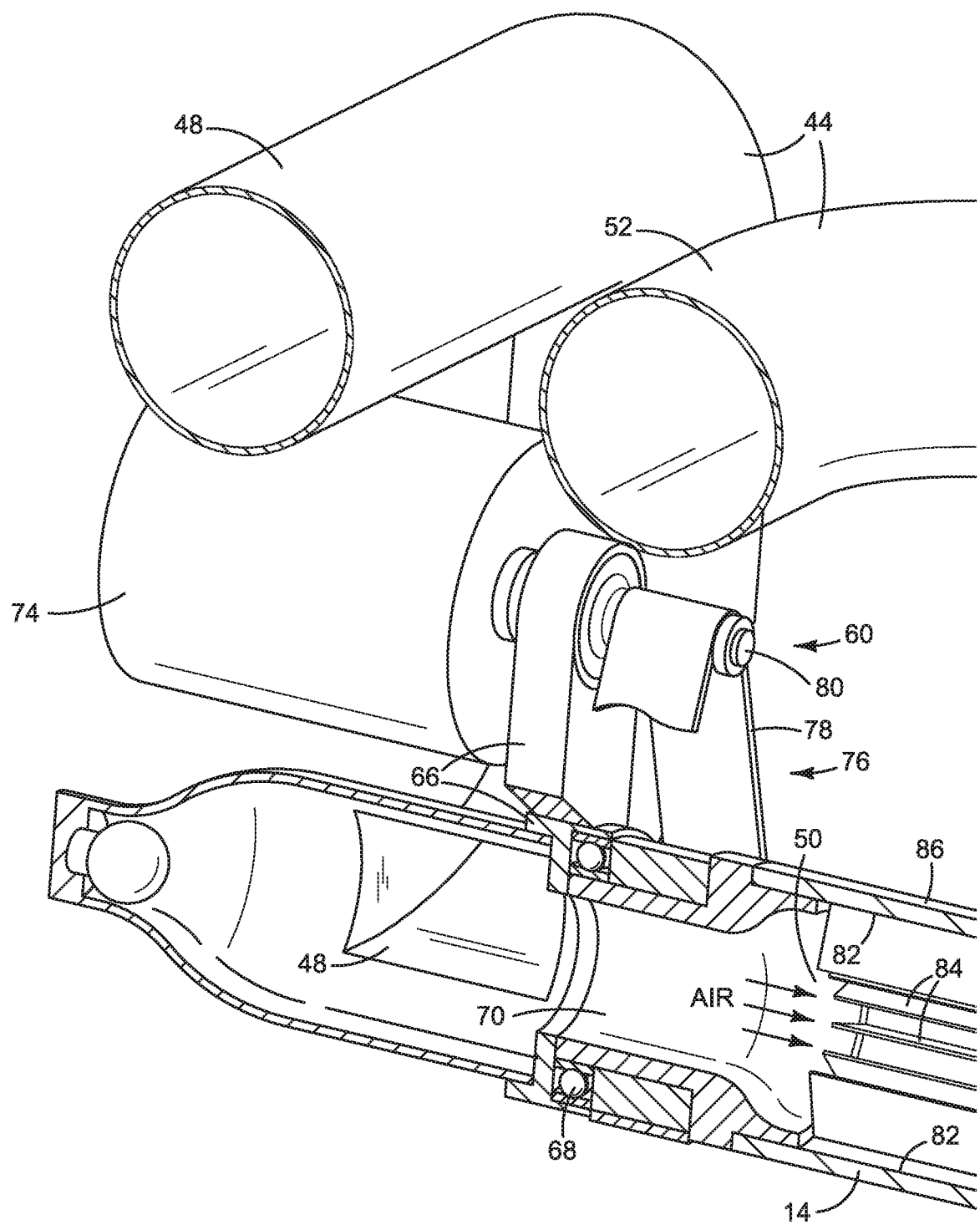
Figure 9:
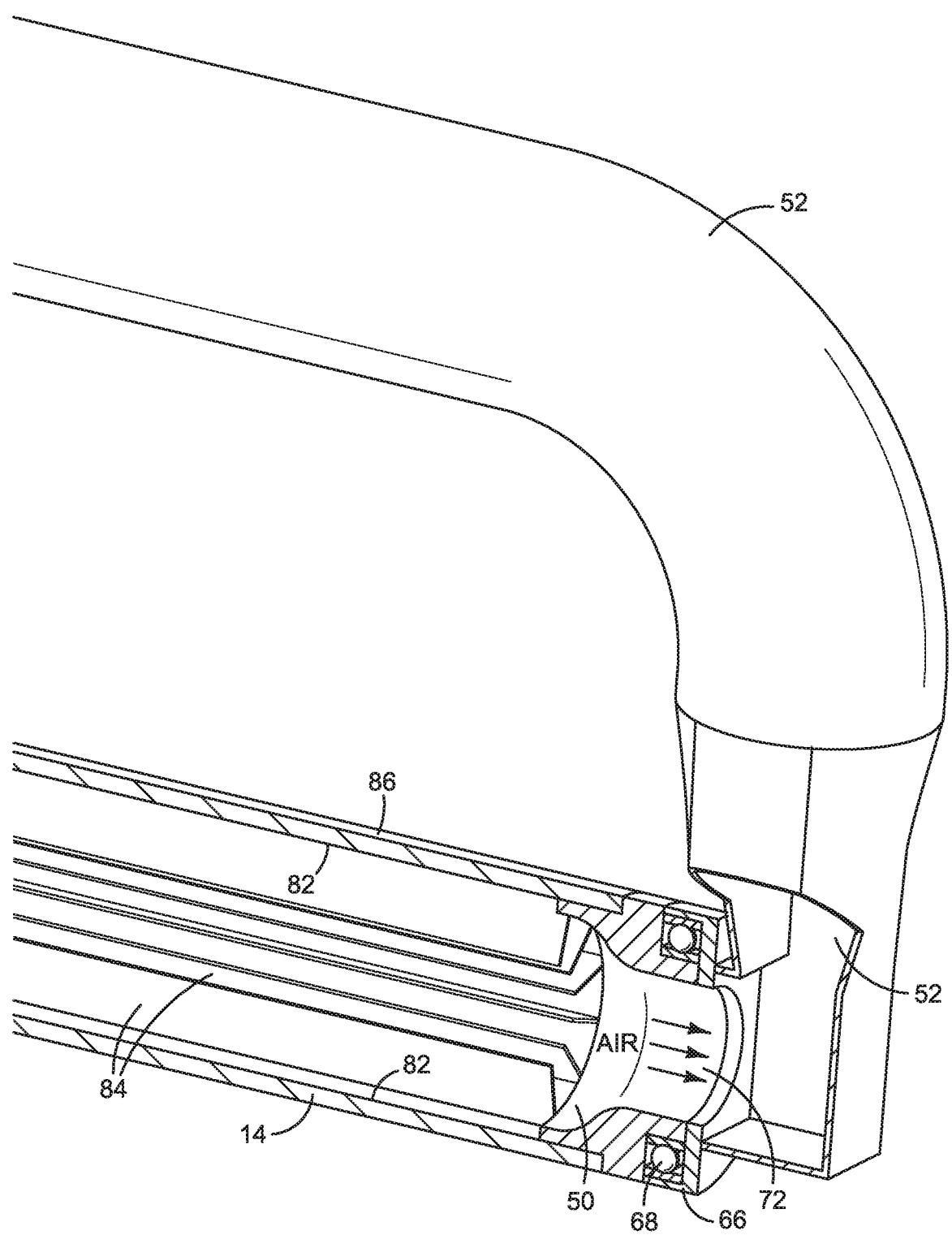

FIGS. 5-10 are perspectives illustrating one example of a rotating spreader roller 14 with ducting 44 to carry cooling air to roller 14. Referring to FIGS. 5-10, a roller assembly 64 includes roller 14 supported in a chassis 66 by bearings 68 (FIGS. 7-9). As best seen in the sections of FIGS. 7-9, bearings 68 allow roller 14 to rotate relative to chassis 66 and relative to ducting 44 (supply and exhaust ducts 48, 52). Although a ball bearing 68 is depicted, any suitable bearing may be used to allow roller 14 to rotate relative to ducts 48 and 52 including, for example, a bushing or other plain bearing. An air passage 50 extends the length of roller 14 from an inlet 70 at one end of roller 14 to an outlet 72 at the other end of roller 14. Ducting 44 includes a supply duct 48 connected to inlet 70 and an exhaust duct 52 connected to outlet 72.

Roller assembly 64 also includes a rotating drive mechanism 60 to rotate roller 14 during a build material spreading operation. In the example shown, rotating drive mechanism 60 includes a motor 74 operatively connected to roller 14 through a drive train 76. In the example shown, drive train 76 includes an endless loop belt 78 to transmit power from a motor drive shaft 80 to roller 14. While a belt drive train 76 is shown, any suitable drive train 76 may be used. Alternatively, drive roller 14 may be driven directly by a motor 74, with no intervening drive train.

As best seen in FIGS. 7-9, inside passage 50 is defined by an interior wall 82 in roller 14. Fins 84 radiating into passage 50 from wall 82 may be used for more efficient heat transfer between the outer surface 86 of roller 14 and the air moving through passage 50. Fins 84 may also be used to help configure the flow of air through passage 50. Although passage 50 and fins 84 have the same size and shape along the full length of passage 50 in FIGS. 7-9, other configurations are possible. The size and shape of passage 50 and the number, size and shape of fins 84 may be varied to achieve the desired heat transfer profile along passage 50, for example to help compensate for a changing ΔT from inlet 70 to outlet 72 as the incoming air is warmed by roller 14 (where ΔT is the temperature difference between roller 14 and the air moving through passage 50).

In the example shown, a contact-less temperature sensor 46 is positioned inside roller 14 near air inlet 70. Any suitable temperature sensor may be used. An infrared sensor 46, for example, may be used to peer down passage 50 to sense the temperature of roller 14. Although a single sensor 46 at one end of roller 14 is shown in FIGS. 7 and 8, multiple temperature sensors 46 and/or at other locations may be used, as desired, to sense the temperature of roller 14 for feedback to controller 40 (FIG. 1).

Figure 11:
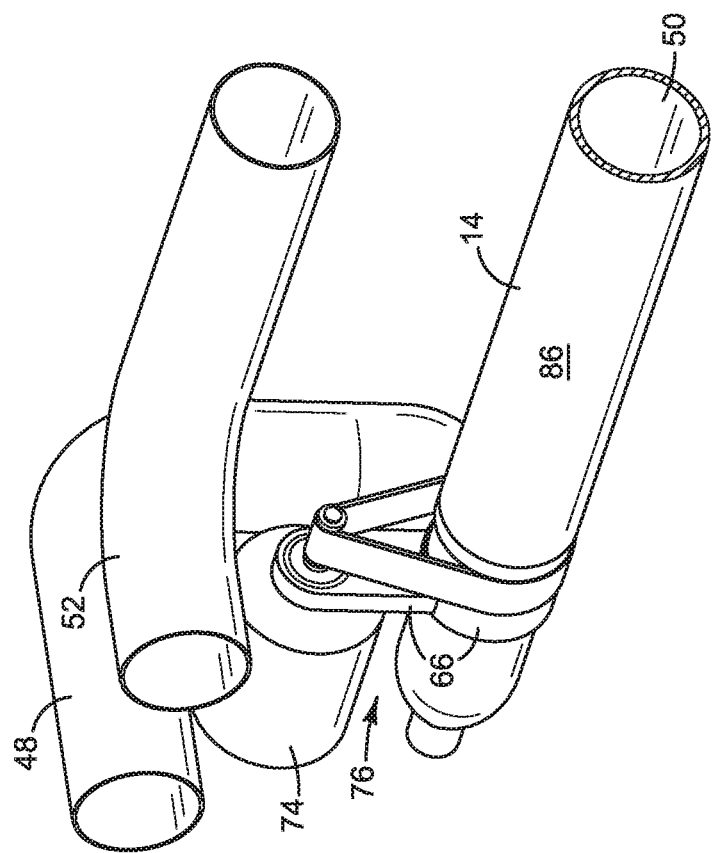
FIG. 11 is a perspective illustrating another example of a rotating spreader roller and ducting to circulate a cooling gas through the roller.
Figure 10:
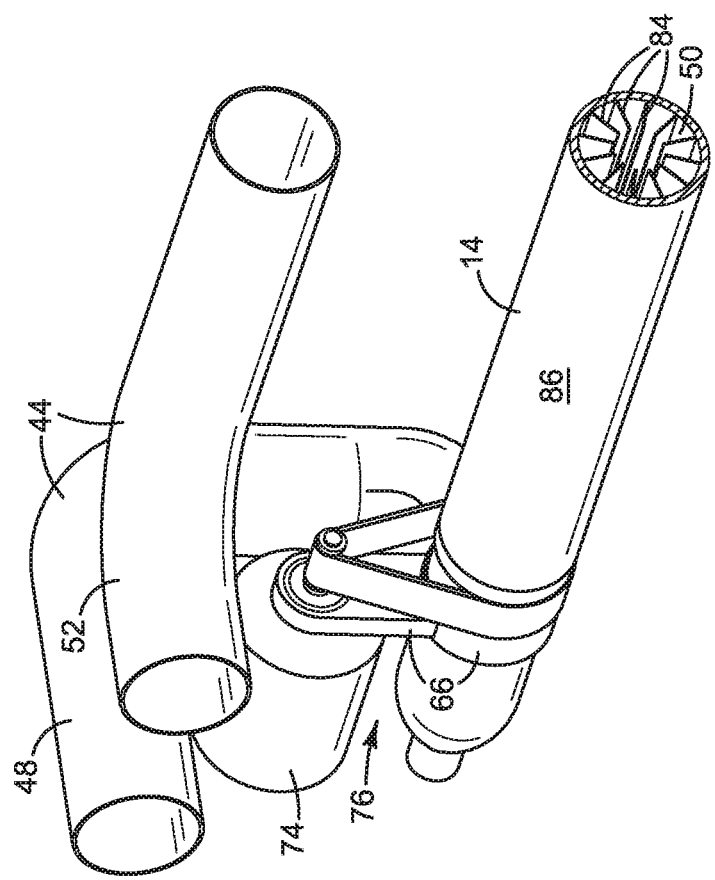

FIG. 11 is a perspective illustrating another example of a rotating spreader roller 14 with ducting 44 to carry cooling air to roller 14. In the example shown in FIG. 11, there are no cooling fins in air passage 50.

Figure 12:
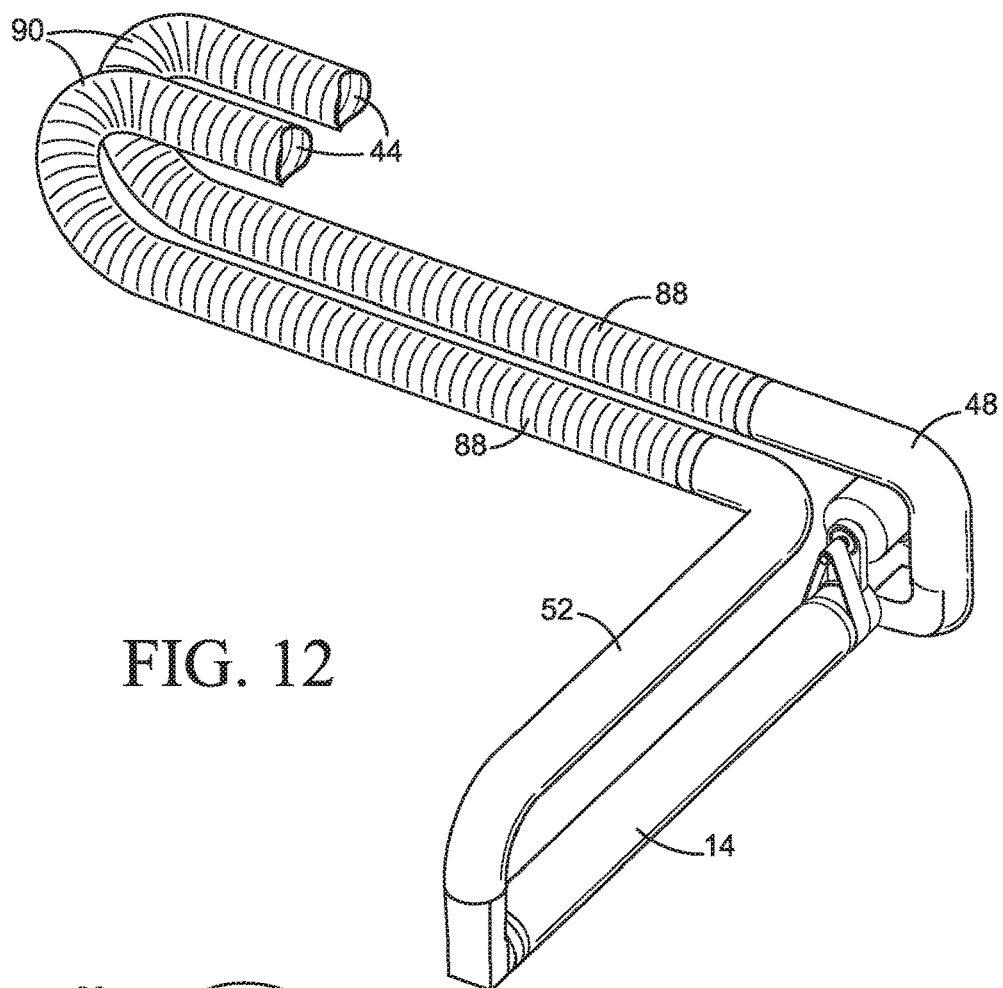
FIGS. 12 and 13 are perspectives illustrating one example of a spreader roller with flexible ducting to circulate a cooling gas through the roller as the roller moves back and forth over a work area.
Figure 13:
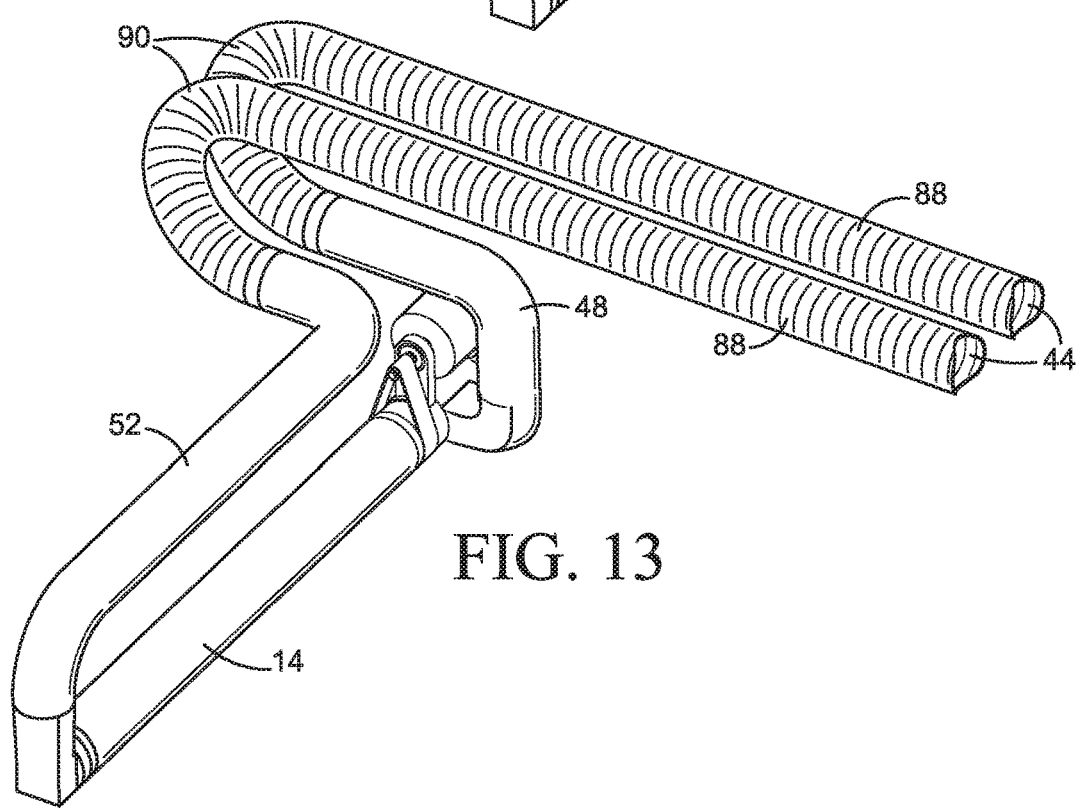

FIGS. 12 and 13 are perspectives illustrating one example of a spreader roller 14 with a loop 90 of flexible ducting 88 for circulating cooling air through the roller with a fan 42 remote from roller carriage 24 (FIG. 1). Referring to FIGS. 12 and 13, supply duct 48 and exhaust duct 52 each include a flexible part 88 with a loop 90 that allows roller 14 to move (translate) back and forth, for example over a work area 20 as shown in FIG. 1, while still circulating cooling air through the roller and without locating either the fan or the exhaust port on the roller carriage 24 (FIG. 1). FIG. 12 shows roller 14 in a first position and FIG. 13 shows roller 14 in a second position to the left of the first position. The length of the flexible part 88 of each duct 48, 52 and the size of loop 90 may vary depending on the range of travel of roller 14. A longer flexible part 88 and a larger loop 90, for example, may be used to accommodate a longer range of travel.

The examples shown in the figures and described above illustrate but do not limit the patent, which is defined in the following claims.

"A", "an", and "the" used in the claims means at least one. For example, "a" temperature sensor means at least one temperature sensor and subsequent reference to "the" temperature sensor means the at least one temperature sensor.

The invention claimed is:

1. A temperature control system for a spreader roller in an additive manufacturing machine, the temperature control system comprising:
   a first duct to carry cooling air to an air passage through the roller;
   a second duct to carry the cooling air away from the air passage through the roller;
   a fan to move the cooling air through the ducts;
   a temperature sensor to sense a temperature of the roller; and
   a controller to control a flow of the cooling air through the ducts based on a temperature sensed by the sensor.

2. The system of claim 1, where the controller is to control the flow of the cooling air through the ducts to maintain a uniform temperature along a length of the roller.

3. The system of claim 1, where the controller is to control the flow of the cooling air through the ducts by regulating a speed of the fan.

4. The system of claim 1, where the air passage extends from an intake connected to the first air duct at one end of the roller and an exhaust connected to the second air duct at the other end of the roller.

5. The system of claim 1, where the temperature sensor is located inside the roller.

6. The system of claim 1, comprising multiple cooling fins protruding from an interior wall of the roller into the air passage.

7. The system of claim 6, where the air passage and the cooling fins have the same size and shape along a full length of the air passage.

8. A system to spread build material over a work area in an additive manufacturing machine, the system comprising:
   a first mechanism to rotate a spreader roller;
   a second mechanism to circulate a cooling gas through the roller to maintain a uniform temperature along a length of the roller; and
   a third mechanism to spread build material over the work area with the roller while the roller is rotated and the cooling gas is circulated through the roller.

9. The system of claim 8, where:
   the second mechanism is to circulate the cooling gas through the roller while the roller is rotating; and
   the third mechanism is to spread build material while the cooling gas is circulated through the rotating roller.

10. The system of claim 9, where the cooling gas is ambient air and the second mechanism includes:
    a first duct to carry the ambient air to a passage through the roller;
    a second duct to carry the ambient air away from the passage through the roller; and
    a fan to move the ambient air through the ducts.

11. The system of claim 10, comprising:
    a temperature sensor to sense a temperature of the roller; and
    a controller to control a flow of the ambient air through the ducts based on a temperature sensed by the sensor.

12. The system of claim 11, where:
    the third mechanism is to move the roller linearly over the work area;
    part of each duct is movable linearly with the roller;
    the fan is stationary relative to the movable part of each duct; and
    each duct includes a flexible part to allow the movable part of the duct to move with the roller relative to the fan.

13. A process to spread powdered build material over a work area in an additive manufacturing machine, comprising:
    circulating cooling air through a rotating roller; and
    while circulating the cooling air through the rotating roller, spreading powdered build material over the work area with the rotating roller.

14. The process of claim 13, where circulating cooling air through a rotating roller includes ducting ambient air to the rotating roller.

15. The system of claim 2, where the controller is to control the flow of the cooling air through the ducts to maintain a uniform temperature of 80° to 120° C. along a length of the roller.

16. The system of claim 8, where the second mechanism is to maintain a uniform temperature of 95° to 135° C. along the length of the roller.

17. The process of claim 14, where circulating cooling air through a rotating roller includes circulating cooling air through the rotating roller to maintain a temperature 80° to 120° C. along a length of the roller.

* * * * *